United States Patent [19]

Jaggi

[11] Patent Number: 4,525,105
[45] Date of Patent: Jun. 25, 1985

[54] DEVICE FOR CONTROLLED BATCH FEEDING OF A FLUIDIZIBLE PARTICULATE MATERIAL AND PROCESS FOR ITS OPERATION

[75] Inventor: Ernst Jaggi, Sunde, Norway

[73] Assignee: Swiss Aluminium Ltd., Chippis, Switzerland

[21] Appl. No.: 383,554

[22] Filed: Jun. 1, 1982

[30] Foreign Application Priority Data

Jun. 15, 1981 [CH] Switzerland .......... 3911/81

[51] Int. Cl.$^3$ .......... B65G 53/06
[52] U.S. Cl. .......... 406/50; 406/122; 222/637; 204/245
[58] Field of Search .......... 222/637; 406/50, 108, 406/122, 198; 204/245

[56] References Cited

U.S. PATENT DOCUMENTS

| 2,609,249 | 9/1952 | Winter | 406/108 X |
| 3,573,200 | 3/1971 | Vogel | 406/108 X |
| 4,165,820 | 8/1979 | Dugge et al. | 222/195 X |

FOREIGN PATENT DOCUMENTS

| 1130754 | 5/1962 | Fed. Rep. of Germany | 406/122 |
| 1161810 | 1/1964 | Fed. Rep. of Germany | 406/122 |
| 1376385 | 9/1964 | France | 204/245 |
| 31477 | 3/1977 | Japan | 406/122 |
| 35739 | 3/1980 | Japan | 406/108 |

Primary Examiner—Joseph J. Rolla
Assistant Examiner—Frederick R. Handren
Attorney, Agent, or Firm—Bachman and LaPointe

[57] ABSTRACT

The device permits controlled batch feeding from a silo with at least one outlet opening and is particularly suitable for supplying alumina from a day's storage silo to the break in the crust on a fused salt electrolytic cell for producing aluminum. Flanged on to the silo outlet is a feed pipe running at an angle steeper than 45° and joining up to the upper half of a containment pipe, likewise inclined steeper than 45°. This containment pipe features at the bottom a compressed air supply line, at the top a receiving or braking chamber and connecting up to that a discharge pipe. By briefly opening the control valve at regular intervals, compressed air is forced into the containment pipe and the plug of particulate material lying there ejected into the receiving or braking chamber.

23 Claims, 2 Drawing Figures

DEVICE FOR CONTROLLED BATCH FEEDING OF A FLUIDIZIBLE PARTICULATE MATERIAL AND PROCESS FOR ITS OPERATION

BACKGROUND OF THE INVENTION

The invention relates to a device for controlled batch feeding of a fluidizible particulate material to a reaction chamber from a silo featuring at least one outlet opening, in particular alumina from a day's storage silo to a break in the crust in a fused salt electrolytic cell for producing aluminum, and relates also to a process for operating the said device.

In the production of aluminum by the fused salt electrolytic reduction of aluminum oxide the latter is dissolved in a fluoride melt made up for the most part of cryolite. The cathodically precipitated aluminum collects under the fluoride melt on the carbon floor of the cell, the surface of the liquid aluminum forming the actual cathode. Dipping into the melt from above are anodes which in conventional processes are made of amorphous carbon. At the carbon anode oxygen is formed as a result of the electrolytic decomposition of the aluminum oxide; this oxygen combines with the carbon of the anode to form $CO_2$ and CO. The electrolytic process takes place in a temperature range of about 940°–970° C.

During the course of the electrolytic process, the electrolyte becomes depleted in aluminum oxide. At a lower concentration of 1–2 wt.% aluminum oxide in the electrolyte the anode effect occurs whereby the voltage increases from 4–5 V to 30 V and more. Then at the latest the crust of solid electrolyte must be broken open and the aluminum oxide concentration raised by addition of alumina.

Under normal operating conditions the cell is serviced this way at regular intervals even when no anode effect occurs. In addition each time the anode effect occurs the crust must be broken open and the concentration of aluminum oxide raised by the addition of alumina, which corresponds to a servicing of the cell.

For many years now this servicing of the cell has been carried out by breaking open the crust between the anodes and the side of the cell and adding the alumina there. This practice has, however, met with increasing disapproval due to the pollution of the air in the pot room and the surrounding atmosphere. With hooded electrolytic cells maximum capture of the fumes from the cell is possible only if this servicing of the cell is automated. After breaking open the crust, the alumina is fed either locally and continuously according to the point feeder method or discontinuously over the whole longitudinal or transverse axes of the cell.

The known storage bunkers or silos mounted on the reduction cells are generally in the form of funnels or containers with funnel-shaped or conical outlet parts at the bottom. The contents of the silo on the cell usually meet one or two days requirements for the cell and can therefore be called day-storage silos.

The supply of alumina from the silo to the break in the crust on the reduction pot is made via conventional devices by opening a flap which is tilted to feed the cell, or via other systems using screw feed arrangements, pistons or the like.

These known batch feeding devices have the disadvantage that mechanically movable parts have to be built in the anodic part of the reduction cell. Consequently they are subjected to the adverse effects of the cell atmosphere, heat and dust, which requires a more or less thorough maintenance for their satisfactory operation.

SUMMARY OF THE INVENTION

It is therefore an object of the present invention to develop a device for controlled batch feeding of a fluidizible particulate material requiring no mechanically movable parts and such that its simple design assures that the said device can be manufactured economically and should be to a large extent maintenance-free. A further object is a process for operating the said device.

With respect to the device, the object of the invention is achieved by way of the invention by means of a feed pipe which is flanged onto the silo outlet, runs at an angle steeper than 45° and joins up to the upper half of a charge containment pipe which is closed at the bottom and, with respect to the horizontal, likewise runs at an angle of at least 45° and such that the longitudinal axes of the feed pipe and the containment pipe form an angle of at least 45° to each other, a compressed air supply line which connects up to the lowest region of the containment pipe and is provided with a control valve operable by means of a time relay, a receiving or braking chamber at the upper end of the containment pipe to receive the ejected plug of particulate material, and a discharge pipe which runs vertically at least in its upper region below the receiving or braking chamber and which, under the force of gravity, delivers the full amount of the charge of particulate material to a predetermined position in the reaction vessel.

BRIEF DESCRIPTION OF THE DRAWINGS

The invention is explained in greater detail with the help of exemplified embodiments shown schematically in the drawings viz., FIG. 1; A view of the lower end of an alumina silo for a fused salt electrolytic cell for producing aluminum having a flanged-on batch feeding device made of steel.

DETAILED DESCRIPTION

Figure 1:
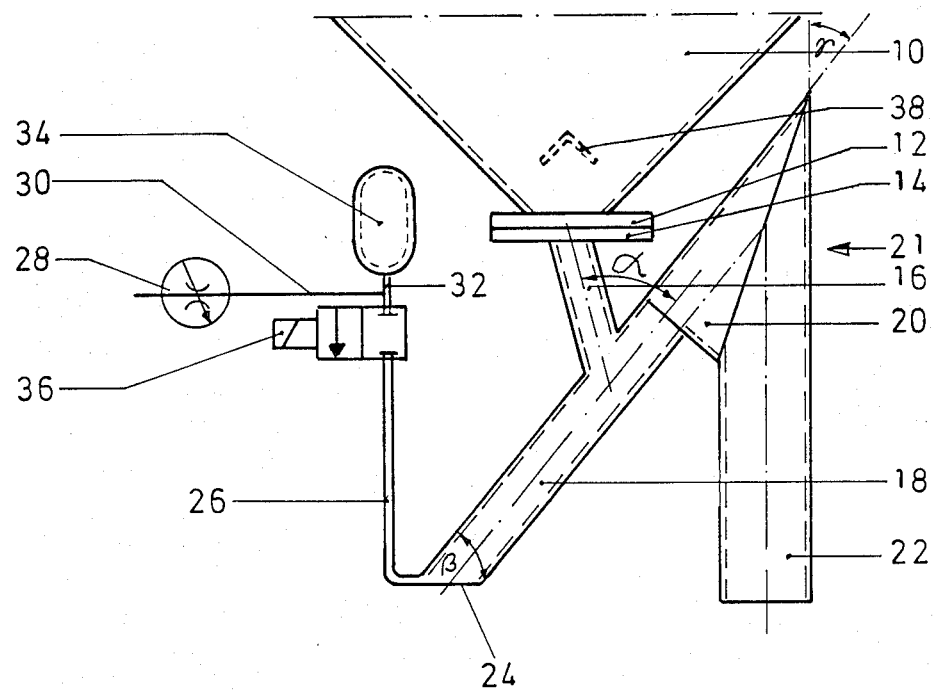

The particulate material flowing out of the silo into the containment pipe via the feed pipe forms a cone when the material stops flowing; the tip of this cone lies in the uppermost region of the connection to the feed pipe. In the lower part of the containment pipe is a compact plug of the fluidizible material.

The silo opening can be provided with a closure facility which is not employed in the normal non-operative phase. However, if the feeding device has to be removed for some reason or other e.g. for repair or due to blockage, the silo can be closed off ahead of the flange.

The minimum length of the feed pipe must be chosen such that the batch feeding device is an adequate distance from the silo. The design of the receiving or braking chamber can in particular have a decisive influence on this minimum length. The maximum length of the feed pipe on the other hand is determined mainly by the geometry of the reaction vessel and the stability required of the feeding device.

Both the minimum inclination of the feed pipe and that of the containment pipe are determined by the angle of free flow of the fluidizible particulate material; it must be greater than the largest angle of free flow in order that undesireable blockage of the pipe can be avoided. These requirements are satisfied with an inclination of at least 45°.

The feed pipe and the containment pipe preferably lie on the same vertical plane. In the case of fused salt electrolytic cells for producing aluminum this vertical plane in which the discharge pipe also preferably lies is usefully parallel to the ends of the cell.

The brief introduction of compressed air into the lowest region of the containment pipe causes the plug of particulate material to be ejected out of that pipe. The kinetic energy in the ejected material must be reduced before the material enters the reaction vessel as the resultant impact could result in disadvantageous effects due to the nature of the material e.g. excessive dust, erosion of exposed parts of the device, splashing of the contents of the reaction vessel.

The receiving or braking chamber according to the invention has therefore to remove the kinetic energy from the particles after they leave the containment pipe. This chamber is so designed that the fast moving particles come into contact with the chamber wall over the shortest possible distance. Usefully a straight containment pipe is welded to a likewise straight discharge pipe such that they run into each other at an acute angle. It is then preferred that the cross section of the discharge pipe is at least equal to that of the containment pipe. The first of these can have, above the junction with the containment pipe, a lid which runs upwards and is inclined with respect to the direction of flight of the ejected plug of material; This inclination can for example be 30°-60°. The uppermost region of the discharge pipe thus forms a receiving or braking chamber which decelerates the particulate material. This chamber must be so large that it can accommodate the whole of the ejected charge before it is conducted to the reaction vessel through the discharge pipe under the force of gravity.

The receiving or braking chamber can for example also be in the form of a sphere or hemisphere, or as a cone or blunted cone.

In order that the whole feeding device need not be replaced if unexpected wear or other problem arises in the region of the receiving or braking chamber, releasable connections can be provided for the feed pipe and containment pipe e.g. bolt-on flanges.

The base of the containment pipe which is usefully flat runs preferably at an acute angle, for example 30°-60°, to the pipe wall at the junction with the compressed air supply line. This enables the compressed air to exercise an optimum pushing action on the plug of particulate material.

Charges of about 1-2 liters have been found to be optimum for continuous point feeding of reduction cells. To achieve reproducible, exact batch feeding the containment pipe is thin and long rather than short and wide; the length of the lower part of the containment pipe, i.e. up to the junction of the feed pipe to that pipe, is preferably at least five times the diameter of the containment pipe. For thin pipes the variation due to inaccuracy in the freeflow angle is smaller as the cone of material formed is smaller than with wide pipes. The upper limit of the ratio of pipe length to pipe diameter is determined on the one hand by the cell geometry, on the other hand by the occurrence of air pockets and/or blockage.

During the ejection of the material from the containment pipe, and in particular also during the fall in pressure of the compressed air, material which is not a constituent part of the charge of compacted material in the containment pipe can also enter the discharge pipe. On the other hand, in particular when the level of material in the silo is low, some of the compressed air could escape through the feed pipe. In order to achieve as accurate as possible batch feeding the following measures can be taken, in addition to a minimum angle of 45° for the longitudinal axes of the feed pipe and containment pipe and the geometry of the latter:

(a) The cross section of the feed pipe is reduced with respect to that of the containment pipe, preferably to a ratio of, for example, 0.1-0.5:1, i.e. in this case the cross section of the feed pipe is only 10-50% of that of the containment pipe.

(b) An angular piece of section opening out downwards is built into the silo immediately above the outlet opening e.g. in the form of a right-angled piece of section bridging the exit opening from the silo. This then prevents excessive flow at the core of the material in the silo, and also to a large extent prevents a hole being shot in the material in the silo when the level of that material is very low.

The cross section of feed pipe and the containment pipe can be of any reasonable geometric form, preferred however are circular cross sections. Pipes with straight longitudinal axes prevent blockage occurring and prevent excessive wear in the upper region of the containment pipe.

For certain applications e.g. for batch feeding of extremely fine particulate material specific constructive measures on the discharge pipe can be directed at minimizing the formation of dust in that the exit speed is reduced by providing bends or curves in the lower part and/or special exit openings.

Finally, according to a particularly advantageous version of the invention, a compressed air accumulator which has approximately the same volume as the containment pipe can be provided upstream of the control valve. Joining up to the connecting pipe between the control valve and the accumulator is a small gauge compressed air feed pipe which features a pressure reducing valve and raises the pressure in the accumulator to 4-8 bar. On opening the control valve the accumulator discharges its compressed air explosively through the compressed air supply line and shoots the plug of particulate material at reproducible velocity out of the containment pipe. After closing the control valve the accumulator is immediately loaded again and ready for operation after 5-10 sec.

With respect to the process for operating the device the object of the invention is achieved by briefly opening the control valve at regular intervals during which compressed air is forced into the containment pipe and the compacted plug of particulate material is ejected into the receiving or braking chamber.

Very good, reproducible results, with less than 1% deviation from the required amount of fresh alumina, have been achieved by forcing compressed air at 4-8 bar into the containment pipe for 0.3-2 sec. The level of material in the silo does not affect the accuracy of the charge delivered.

In the pot rooms of modern aluminum smelters both the duration and frequency of the compressed air pulses and the loading of an accumulator, if such is desired, are controlled via electronic data processors and coordinated with crust breaking devices.

Referring to the drawings, the lower conical shaped part 10 of an alumina silo shown in FIG. 1 is fitted with a flange 12 and a round outlet opening, the inner diameter of which corresponds to that of the feed-pipe 16 secured to the silo by means of a flange 14. The longitudinal axis of this feed-pipe forms an angle α of approximately 50° with the longitudinal axis of the charge containment pipe 18.

Pipe 18 which has an inner diameter of about 60 mm joins up, just above the junction with the feed-pipe 16, with a much broader length of pipe 20 which corresponds in diameter to that of the discharge pipe 22. Both pipes 20 and 22 are joined at an acute angle γ of approximately 40° along an elliptical weld seam and form in this region a receiving or braking chamber 21.

The flat floor base 24 of pipe 18 forms an acute angle β of approximately 50° with the tube wall of the pressure supply line 26.

The compressed air is passed via a compressed air supply line 30 of 1-2 mm inner diameter fitted with a pressure regulating valve 28 to a connecting pipe 32 between compressed air accumulator 34 and control valve 36. With the control valve 36 closed, the accumulator 34 is charged with compressed air. On opening the control valve 36 the accumulator discharges the air in it initially explosively, through the connecting pipe 32 and supply line 26 which have an internal diameter of 10-20 mm. The plug of particulate material is shot out of the containment pipe 18. If the control valve 36 is still open for a fraction of a second after the plug of material has been shot out of pipe 18, only a small amount of compressed air flows from supply lines 30 and 26 into pipe 18 and then into the discharge pipe 22. This amount of air is not sufficient to convey significant amounts of the alumina flowing out of the feed-pipe 16. It is therefore not essential for the accuracy of batch feeding for the control valve 36 to close exactly as the plug of charge material leaves the containment pipe 18.

Immediately above the outlet opening from the lower part of the silo 10 is a right-angled piece of section 38 opening out downwards and secured to the conical wall of the silo.

The version shown in FIG. 2 differs from that in FIG. 1 in the following respects:

The feed pipe 16 is flatter, the containment pipe 18 steeper; the angle α between the longitudinal axis of this pipe and discharge pipe 22 remains approximately the same.

The upper, open end of the containment pipe 18 projects into the upper region of the discharge pipe 22. The diameter of this pipe 22 is, in comparison to that of pipe 18, much larger, at least twice as much in cross section, and is connected by a flat lid 44 matching the silo wall 42. For stability reasons and for better transmission of the vibrations occurring as the plug of particulate material is shot out of pipe 18 (improvement in the flow of the material), the silo wall 42 and the flat lid 44 can be releasably attached to each other. The enlarged receiving or braking chamber 21 still ends in an acute angle γ in spite of the change in design.

The outlet 46 from the discharge pipe 22 is reduced to only a fraction of the cross section of its upper part by provision of a steep end sheet 48.

The base 24 of the containment pipe 18 is fitted at a more acute angle of approximately 40°.

A compressed air supply unit with control valve as in FIG. 1 is not shown here. On the other hand, indicated in broken lines here, is a crust breaking facility comprising chisel 50, chisel alignment 52 and pressure piston 54. The outlet 46 from the discharge pipe 22 is directed at the opening in the crust of solidified electrolyte created by the chisel 50.

The batch feeding unit, ready for use, features a horizontal sheet 57 which, when mounted on the hooding 58 over the cell, closes off the opening provided for the unit. Suitable materials 56 for sealing off the joint help maintain the full efficiency of the hooding 58. The compressed air supply line 26 under the hooding is made of steel; the part of that system above the hooding can be of a flexible synthetic material as the heat there is much less intense.

A dividing wall 40 above the angular section 38 divides the silo into a large container and a small container. In the projection onto a horizontal plane the angular section 38 and the dividing wall 40 can be at any desired angle.

Figure 2:
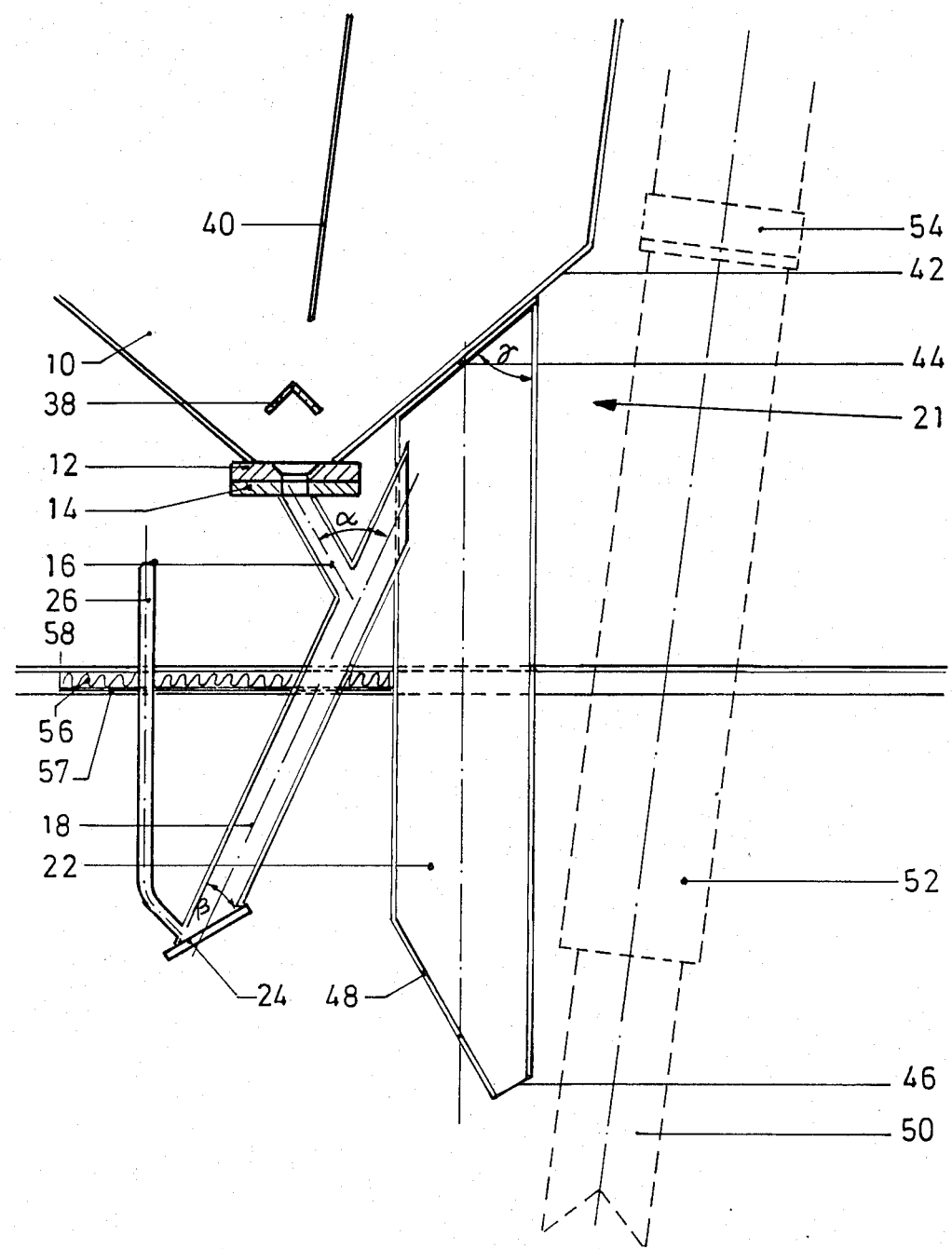
FIG. 2; Another version of the device shown in FIG. 1, showing here a vertical cross section.

The reproducibility of the charges of fresh, commercially available alumina was tested with the device as shown in FIG. 2 employing various times of opening the control valve (36 in FIG. 1) using a time relay. The following charges were obtained using a 35 mm diameter silo outlet and the same inner diameter of feed pipe 16:

TABLE I

| Charges as a function of the time of holding the control valve open | | | |
|---|---|---|---|
| 0.3 sec. | 0.8 sec. | 1.1 sec. | 1.9 sec. |
| 1540 g | 1545 g | 1550 g | 1560 g |
| 1555 g | | 1580 g | 1550 g |
| 1560 g | | 1560 g | 1555 g |
| 1545 g | | 1560 g | 1545 g |
| 1545 g | | 1558 g | 1520 g |

With the control valve open for intervals of 0.3-1.9 sec. the average deviation lies far below 1%.

Comparative trials using intervals of approximately 4 sec. on the other hand led to much higher charges being delivered, in the range of approximately 1800 g.

What is claimed is:

1. Device for controlled batch feeding of a fluidizable particulate material from a silo which comprises: a silo for storing particulate material; outlet means on said silo for discharging particulate material; a feed pipe communicating with and sloping downwardly from said silo outlet; a charge containment pipe sloping upwardly from a closed bottom end to a discharge end, said feed pipe communicating with said containment pipe intermediate its ends and forming an angle with respect to the containment pipe, said feed pipe being joined to the upper half of said containment pipe at a location which is displaced from a vertical line extending through said silo outlet means; a discharge pipe communicating with and extending downwardly from said charge containment pipe at the discharge end of the containment pipe for discharging particulate material; and means communicating with said charge containment pipe adjacent said closed end for supplying a charge of compressed air to said charge containment pipe below said location to transfer the material from said charge containment pipe to said discharge pipe.

2. A device according to claim 1 for controlled batch feeding of alumina from a day's storage silo to a break in the crust in a fused salt electrolytic cell for producing aluminum.

3. A device according to claim 1 wherein said feed pipe is flanged onto said silo outlet and slopes at an angle to the horizontal steeper than 45°.

4. A device according to claim 3 wherein said charge containment pipe slopes at an angle to the horizontal of at least 45° and such that the longitudinal axes of the feed pipe and containment pipe form an acute angle of not less than 45° to each other.

5. A device according to claim 1 including a compressed air supply line which connects up to the lowest region of the containment pipe and is provided with a control valve operable by means of a time relay.

6. A device according to claim 1 including a receiving or braking chamber at the upper end of the containment pipe to receive the charge of particulate material.

7. A device according to claim 6 wherein said discharge pipe communicates with said receiving or braking chamber and wherein said discharge pipe extends vertically at least in its upper region below the receiving or braking chamber and which, under the forces of gravity, delivers the full amount of the charge of particulate material to a predetermined position.

8. A device according to claim 1 wherein the longitudinal axes of the containment pipe and the feed pipe lie on a common vertical plane.

9. A device according to claim 1 wherein said containment pipe is closed at the bottom by means of a flat base which forms an acute angle with the containment pipe, and a compressed air supply line from said means for supplying a charge of compressed air joins up with said containment pipe at said flat base.

10. A device according to claim 9 wherein said acute angle is from 30° to 60°.

11. A device according to claim 1 wherein the cross section of the feed pipe is smaller than that of the containment pipe.

12. A device according to claim 11 wherein the ratio of the cross section of the feed pipe to that of the containment pipe is from 0.1–0.5:1.

13. A device according to claim 1 wherein a deflecting means is provided in the silo immediately above said outlet means.

14. A device according to claim 15 including a compressed air accumulator upstream of the compressed air supply line.

15. A device according to claim 14 wherein said compressed air accumulator has the same volume as said containment pipe and including a small gauge compressed air feed line for charging said accumulator fitted with a reduction valve, wherein said accumulator can be discharged by pneumatic operation of said control valve.

16. A process for feeding fluidizable particulate material from a silo which comprises: providing a silo having a silo outlet for storing particulate material; providing a feed pipe communicating with and sloping downwardly from said silo outlet; providing a charge containment pipe which slopes upwardly from a closed bottom end to a discharge end, said containment pipe communicating with said feed pipe for receiving particulate material from said silo, said feed pipe being joined to the upper half of said containment pipe at a location which is displaced from a vertical line extending through said silo outlet; feeding particulate material from said silo to said charge containment pipe intermediate its ends; providing a discharge pipe communicating with and extending downwardly from the discharge end of said charge containment pipe for discharging particulate material; and forcing compressed air into said containment pipe adjacent said closed end and below said location whereby the particulate material lying in said containment pipe is ejected from said containment pipe into said discharge pipe.

17. A process according to claim 16 including means communicating with said charge containment pipe for supplying a charge of compressed air to said charge containment pipe to transfer the material from said containment pipe to said discharge pipe, wherein said compressed air is forced into the containment pipe at regular intervals of time by briefly opening a control valve.

18. A process according to claim 16 including a receiving or braking chamber communicating with said charge containment pipe and discharge pipe, wherein the particulate material lying in the charge containment pipe is discharged from the charge containment pipe into the receiving or braking chamber prior to discharge into the discharge pipe.

19. A process according to claim 17 wherein the compressed air is forced into the containment pipe for 0.3 to 2 seconds at a pressure of 4 to 8 bar.

20. Device for controlled batch feeding of a fluidizable particulate material from a silo which comprises: a silo for storing particulate material; outlet means on said silo for discharging particulate material; a feed pipe communicating with and sloping downwardly from said silo outlet; a sloping charge containment pipe having an upper discharge end and a closed bottom end opposed to said discharge end, said feed pipe communicating with said containment pipe intermediate its ends and forming an angle with respect to the containment pipe; a discharge pipe communicating with said charge containment pipe at the discharge end of the containment pipe for discharging particulate material; and means communicating with said charge containment pipe adjacent said closed end for supplying a charge of compressed air to said charge containment pipe to transfer the material from said charge containment pipe to said discharge pipe, wherein the charge containment pipe communicates with said discharge pipe at the uppermost portion of said charge containment pipe and wherein the cross section of the containment pipe is enlarged at its uppermost part at the locus of communication with said discharge pipe, and wherein both said containment pipe and discharge pipe meet to form an acute angle and are welded together to create a receiving or braking chamber.

21. A device according to claim 20 wherein said acute angle is from 30° to 60°.

22. Device for controlled batch feeding of a fluidizable particulate material from a silo which comprises: a silo for storing particulate material; outlet means on said silo for discharging particulate material; a feed pipe communicating with and sloping downwardly from said silo outlet; a sloping charge containment pipe having an upper discharge end and a closed bottom end opposed to said discharge end, said feed pipe communicating with said containment pipe intermediate its ends and forming an angle with respect to the containment pipe: a discharge pipe communicating with and extending downwardly from said charge containment pipe at the discharge end of the containment pipe for discharging particulate material; and means communicating with said charge containment pipe adjacent said closed end for supplying a charge of compressed air to said charge containment pipe to transfer the material from said charge containment pipe to said discharge pipe, wherein the charge containment pipe communicates with said discharge pipe at the uppermost portion of said charge containment pipe and including a generally flat lid situated above the locus of communication of said discharge pipe and containment pipe, wherein said lid is inclined upwards and forms an angle with respect to the discharge pipe so that the uppermost region of the discharge pipe forms a receiving or braking chamber.

23. A device according to claim 22 wherein said lid angle is from 30° to 60°.

* * * * *

UNITED STATES PATENT AND TRADEMARK OFFICE
CERTIFICATE OF CORRECTION

PATENT NO. : 4,525,105
DATED : June 25, 1985
INVENTOR(S) : Ernst Jaggi

It is certified that error appears in the above—identified patent and that said Letters Patent are hereby corrected as shown below:

Column 2, line 40, after "Fig. 1" change ";" to --:--.

Column 2, line 43, after "Fig. 2" change ";" to --:--.

Column 7, claim 14, line 45, change "claim 15" to --claim 5--.

Column 8, claim 22, line 64, after "pipe" (first occurrence), change ":" to --;--.

Signed and Sealed this

Fifth Day of November 1985

[SEAL]

Attest:

DONALD J. QUIGG

Attesting Officer

*Commissioner of Patents and Trademarks*